US009227285B1

(12) United States Patent
Briggs (10) Patent No.: US 9,227,285 B1
(45) Date of Patent: Jan. 5, 2016

(54) REMOVABLE RESERVOIR FOR MACHINE TOOL (75) Inventor: Edward L. Briggs, Goose Lake, IA (US)

(73) Assignee: C. & E. Fein GmbH (DE)

(*) Notice: Subject to any disclaimer, the term of this patent is extended or adjusted under 35 U.S.C. 154(b) by 1071 days.

(21) Appl. No.: 12/941,512

(22) Filed: Nov. 8, 2010

Related U.S. Application Data (60) Provisional application No. 61/260,251, filed on Nov. 11, 2009.

(51) Int. Cl.
| | |
|---|---|
| *B23Q 11/10* | (2006.01) |
| *B23Q 9/00* | (2006.01) |
| *B23B 45/14* | (2006.01) |
| *B23C 1/06* | (2006.01) |
| *B23B 45/00* | (2006.01) |
| *F16N 7/02* | (2006.01) |

(52) U.S. Cl.
CPC ............ *B23Q 11/1092* (2013.01); *B23B 45/00* (2013.01); *B23Q 9/00* (2013.01); *B23Q 11/1084* (2013.01); *B23B 2260/10* (2013.01); *B23C 1/06* (2013.01); *B23C 2250/12* (2013.01); *F16N 7/02* (2013.01); *Y10T 408/44* (2015.01); *Y10T 408/455* (2015.01); *Y10T 408/554* (2015.01); *Y10T 409/304032* (2015.01)

(58) Field of Classification Search
CPC ............ B23Q 11/1092; Y10T 408/554; Y10T 408/44; Y10T 408/45; Y10T 408/455; Y10T 409/303976; Y10T 409/304032
USPC .................. 408/56, 57, 59, 76; 409/135, 136
See application file for complete search history.

(56) References Cited

U.S. PATENT DOCUMENTS

| | | | | |
|---|---|---|---|---|
| 2,956,455 A | * | 10/1960 | Chaney | 408/56 |
| 4,664,565 A | * | 5/1987 | Palm | 408/6 |
| 4,753,556 A | * | 6/1988 | Solko | 408/61 |
| 5,007,776 A | * | 4/1991 | Shoji | 408/6 |
| 5,174,690 A | * | 12/1992 | Targett et al. | 408/76 |
| 5,233,744 A | * | 8/1993 | Noland | 451/439 |
| 5,330,298 A | * | 7/1994 | Welch et al. | 409/80 |
| 5,444,634 A | * | 8/1995 | Goldman et al. | 700/169 |
| 6,095,728 A | * | 8/2000 | Howie | 409/235 |
| 7,494,306 B2 | * | 2/2009 | Sihmada | 409/136 |
| 7,862,267 B2 | * | 1/2011 | Shimada | 409/185 |
| 9,114,492 B2 | * | 8/2015 | Baditoi | B23Q 11/10 |
| 2015/0266105 A1 | * | 9/2015 | Scheid | B23B 39/14 408/1 R |

FOREIGN PATENT DOCUMENTS

| | | | | |
|---|---|---|---|---|
| GB | 2060442 A | * | 5/1981 | ............ B23Q 11/10 |
| WO | WO-2006/009184 A1 | * | 1/2006 | |

* cited by examiner

*Primary Examiner* — Erica E Cadugan
(74) *Attorney, Agent, or Firm* — Jason R. Sytsma; Shuttleworth & Ingersoll, PLC (57) ABSTRACT

According to the present invention, there is provided a gravity-feed liquid delivery system for a machine tool. A liquid reservoir has an attachment mechanism to attach the reservoir to a structure separate from the machine tool. Coolant contained in the reservoir is transmitted by a hose having a first end combined to the liquid reservoir and a second end attachable to the machine.

24 Claims, 8 Drawing Sheets

Embodiment Wherein the
Attachment Mechanism is a Hook

FIG. 7

Embodiment Wherein the Attachment Mechanism is an Adhesive Material

FIG. 8

REMOVABLE RESERVOIR FOR MACHINE TOOL

CROSS-REFERENCE TO RELATED APPLICATIONS

The present application claims the benefit of provisional patent application 61/260,251 filed Nov. 11, 2009, which is incorporated herein by reference.

BACKGROUND

The instant invention relates generally to a liquid delivery system for power machine tools and more specifically to removable and repositionable liquid reservoirs.

Numerous machine tools have been disclosed in the prior art that require coolant or lubricant applied to the cutting area to increase the speed at which the machine tools cut and extend the useful life of the cutting bits. While these units may be suitable for the particular purpose to which they address, they would not be as suitable for the purposes of the present invention as heretofore described.

SUMMARY

According to the present invention, there is provided a gravity-feed liquid delivery system for a machine tool. A liquid reservoir has an attachment mechanism to attach the reservoir to a structure separate from the machine tool. Coolant contained in the reservoir is transmitted by a hose having a first end combined to the liquid reservoir and a second end attachable to the machine. The reservoir is moveable between a first position attached to the machine tool and a second position remote from the machine tool. In operation, the machine tool can be oriented in any position and the reservoir is repositionable to an elevated position higher than an arbor assembly of the machine tool.

In another embodiment, a portable gravity-feed liquid delivery system is provided. A liquid reservoir has an attachment mechanism attached to the liquid reservoir for attaching the liquid reservoir to a structure integral with or separate from a machine tool. A hose that has a first end combined to the liquid reservoir and a second end selectively positionable at a second position is capable of supplying liquid from the liquid reservoir to an operating area.

DRAWINGS

For a more complete understanding of particular embodiments and their features and advantages, reference is now made to the following description, taken in conjunction with the accompanying drawings, in which.

DETAILED DESCRIPTION

Figure 1:
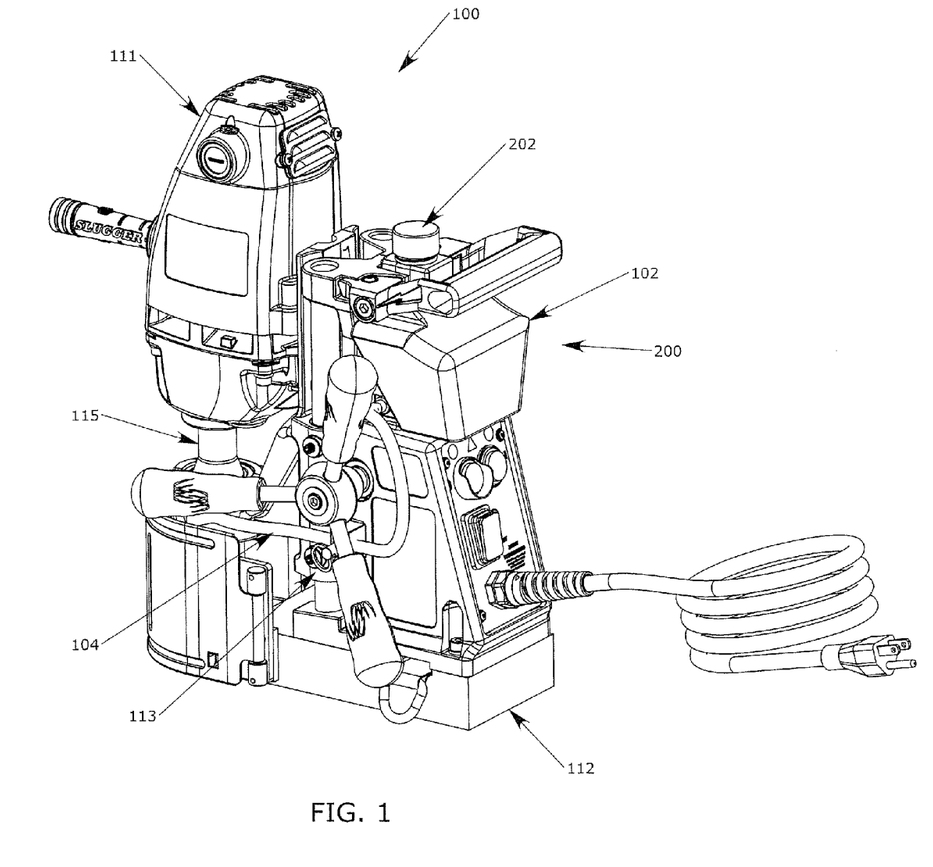
FIG. 1 is a perspective view of a machine tool showing the gravity-feed liquid delivery system with the reservoir in a first position on the machine tool.
Figure 2:
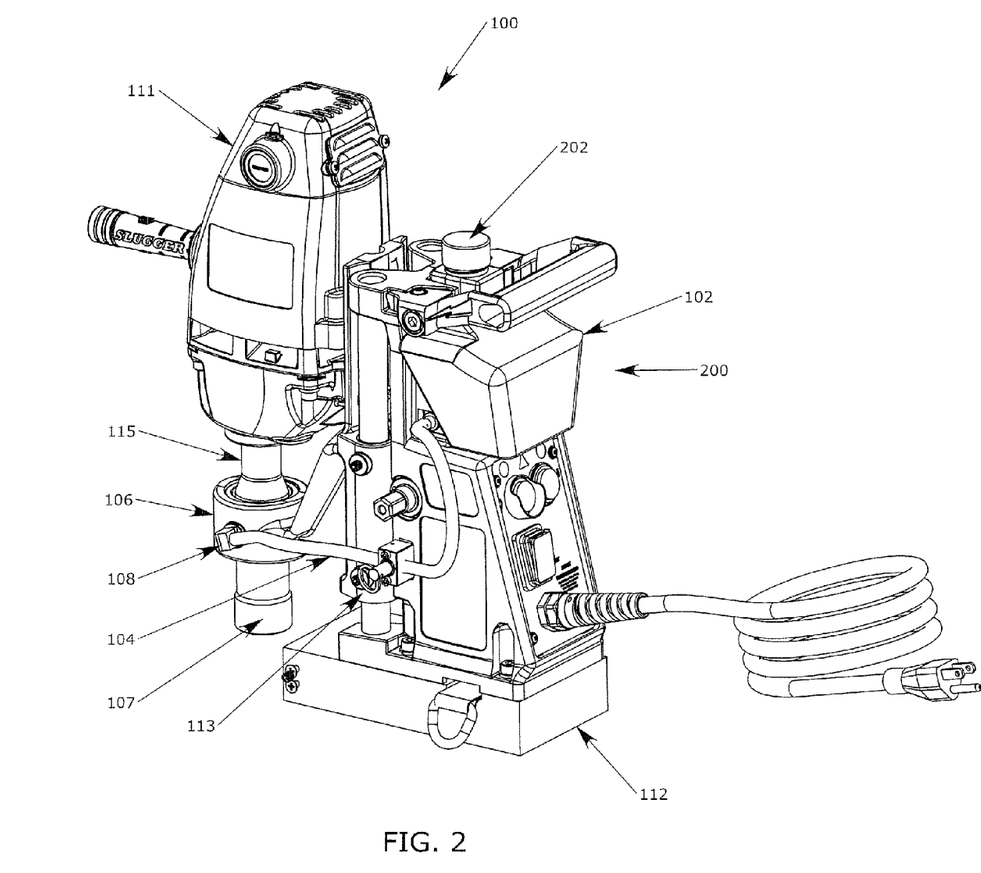
FIG. 2 is a perspective view of the machine tool of FIG. 1 with the chip guard and the feed handle removed.
Figure 3A:
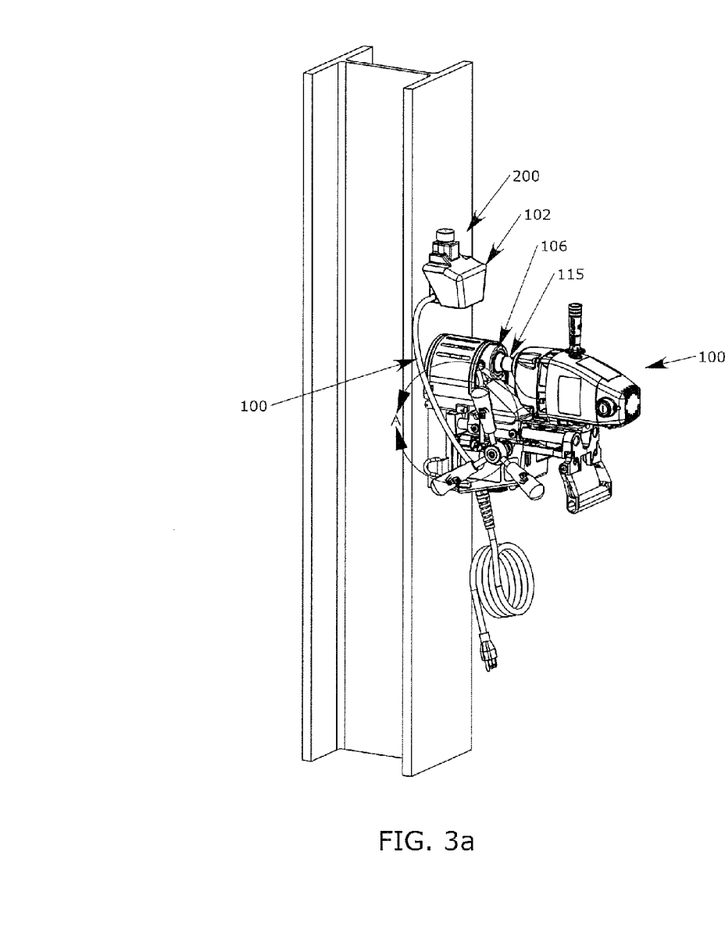
FIG. 3*a* is a perspective view of the machine tool in FIG. 1 in the horizontal drilling position with the reservoir in a second position remote from the machine tool.
Figure 3B:
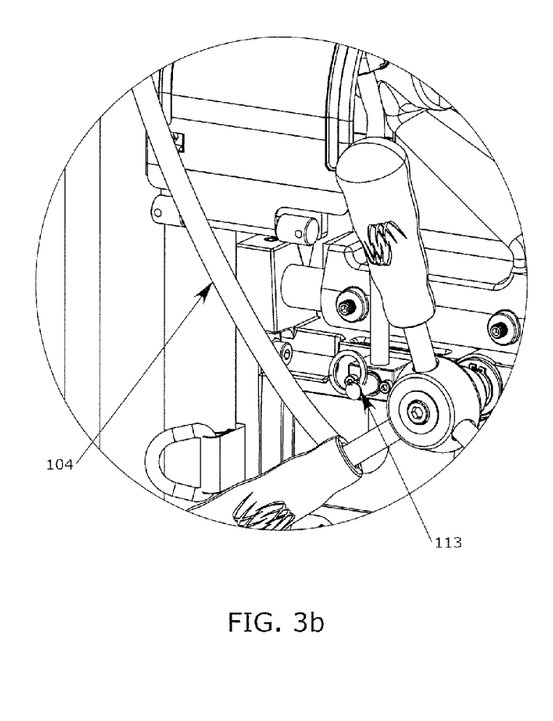
FIG. 3*b* is an enlarged detailed view of that portion of FIG. 3*a* designated in the circle A.
Figure 4A:
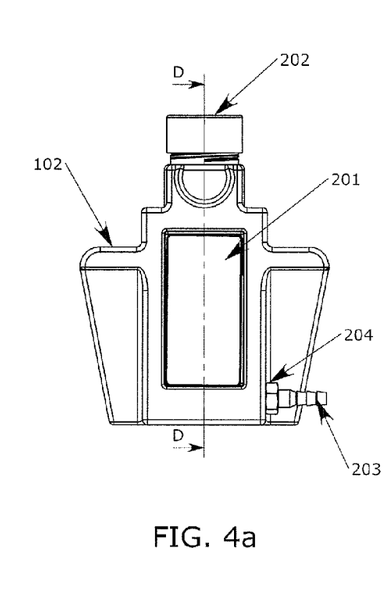
FIG. 4*a* is a back view of the reservoir of the gravity-feed liquid delivery system.
Figure 4B:
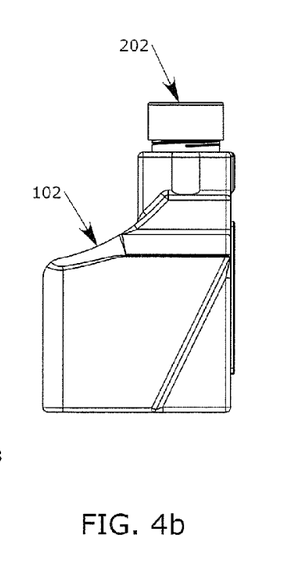
FIG. 4*b* is a side view of the reservoir of the gravity-feed liquid delivery system.
Figures 4C, 4D:
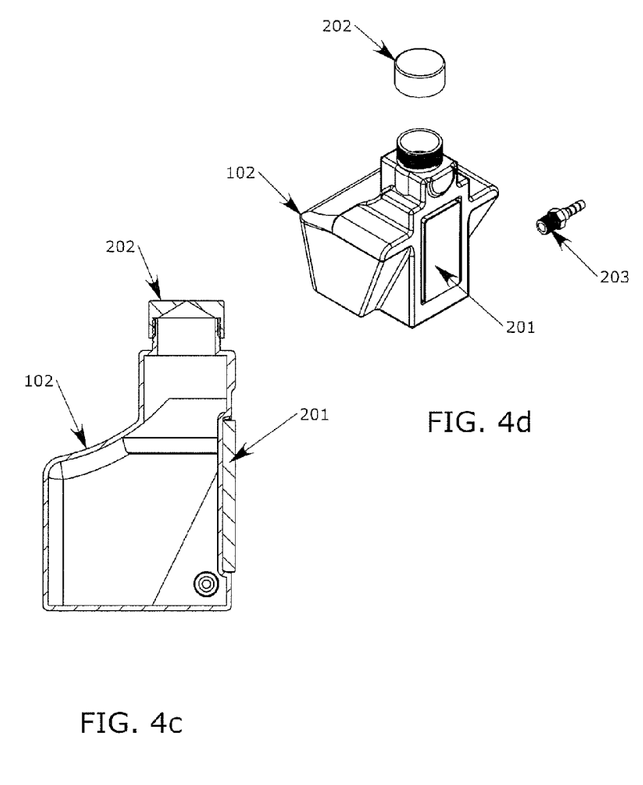
FIG. 4*c* is a section view taken along the line D-D of FIG. 4*a* of the reservoir of the gravity-feed liquid delivery system.
FIG. 4*d* is a perspective view of the gravity-feed liquid delivery system.

Referring to FIGS. 1-3, a portable machine tool 100 having a geared motor 111 mounted on a magnetic base 112 is illustrated. A fluid reservoir 102 is attached to the portable machine tool 100 above the magnetic base 112. A hose extends from the reservoir 102 to the arbor 115 to provide fluid flow to the cutting tool. The reservoir 102 is selectively moveable and repositionable to allow gravity-fed coolant flow to the cutting tool when the portable machine tool 100 is any position.

More specifically, the preferred embodiment discloses a gravity-feed liquid delivery system 200 for a machine tool 100. In the preferred embodiment, where the machine tool 100 is a portable drilling machine 100, it may be advantageous to drill horizontally or any position in which the arbor 115 is level to or at a higher elevation than the reservoir 102. In such instances, the removable reservoir 102 is moved from a first position on the portable power tool 100 to a second position remote from the portable power tool 100. When the removable reservoir 102 is at its second position and elevated higher than the portable power tool 100, the gravity-feed liquid delivery system 200 continues to deliver coolant or lubricant to the drilling surface.

Figure 7:
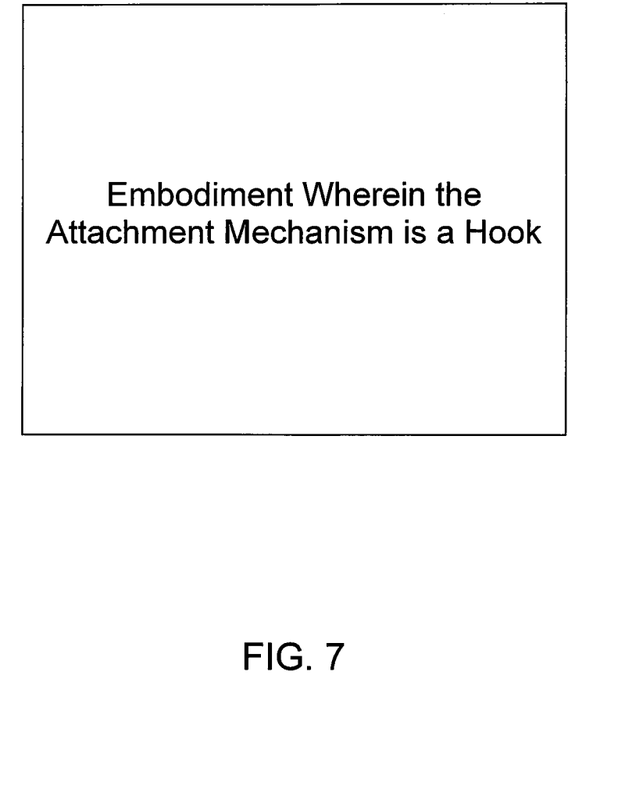
FIG. 7 is a schematic view of yet another embodiment of the attachment mechanism.
Figure 8:
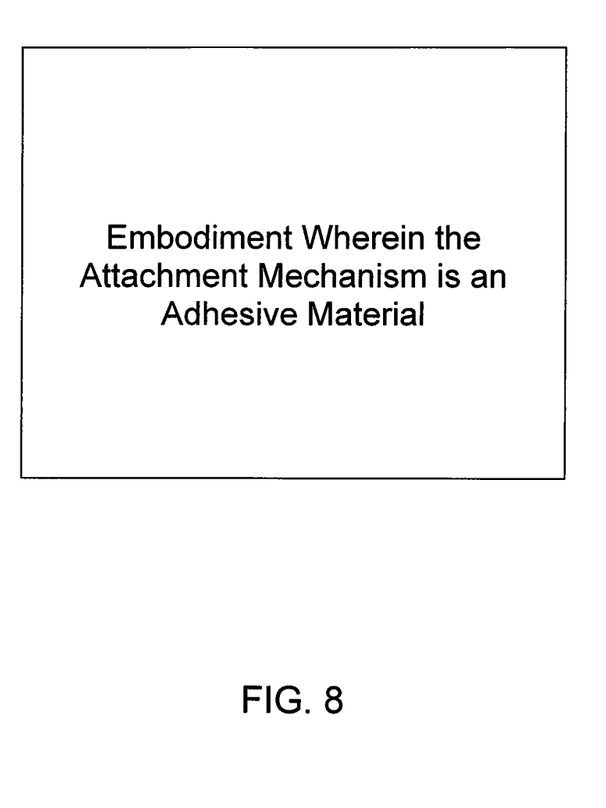
FIG. 8 is a schematic view of yet another embodiment of the attachment mechanism.

Referring to FIGS. 3*a* and 3*b* where the drill 100 is in the horizontal drilling position, the reservoir 102 includes an attachment mechanism 201 to hold the reservoir 102 in its second position remote from the machine tool 100. In the preferred embodiment and better illustrated in FIGS. 4*a*-4*d*, the attachment mechanism 201 is a magnet 201; however, in alternative embodiments, the attachment mechanism 201 may include, but not limited to, a hook (as shown in FIG. 7), an adhesive material (as shown in FIG. 8), or manually held by an operator at the second position.

In an alternative embodiment, a moveable member (not shown) combines the machine tool 100 with the reservoir 102. The moveable member pivots outward from the machine tool 100 thereby moving the reservoir to a second position remote from the machine tool 100. More specifically, the moveable member may be a plate that is pivotally attached to the machine tool 100 with the reservoir 102 attached thereon. The moveable member pivots outward and upward to position the reservoir 102 in a second position remote from the machine tool 100 when the machine tool 100 is in a horizontal drilling position. In the second position, the reservoir is elevated higher than the machine tool 100 and the force of gravity supplies liquid to the cutting surface.

Referring back to FIGS. 4*a*-4*d*, the reservoir 102 is more specifically described. Substantially near the bottom of the reservoir 102 is an outlet port 204. A fitting 203 combines the outlet port 204 to a hose 104 or, alternatively, a valve 113 is disposed in the outlet port 204 of the reservoir 102. The outlet port 204 is positioned to allow free flow of liquid out of the reservoir 102 and in to the hose 104. If the valve 113 is used, the valve 113 provides controlled fluid flow from the reservoir 102. Obviously, however, the valve 113 can be disposed at any point in the hose 104 and still provide controlled flow from the reservoir 102. The reservoir 102 and hose 104 are made of a translucent material to allow the operator to visualize the supply of liquid. A removable lid 202 at the top of the reservoir 102 is conveniently placed for easy filling of the reservoir 102.

In the preferred embodiment, the machine tool 100 is adapted to annular cutters, which have a hollow center portion. A ring assembly 106 is combined with the arbor 115 of the machine tool 100. A hose 104 connecting the ring assembly 106 to the reservoir 102 provides a path for fluid flow. Fluid flows through hose 104 to the inside of the annular cutter from the reservoir 102 when the machine tool 100 is cutting.

Figure 5A:
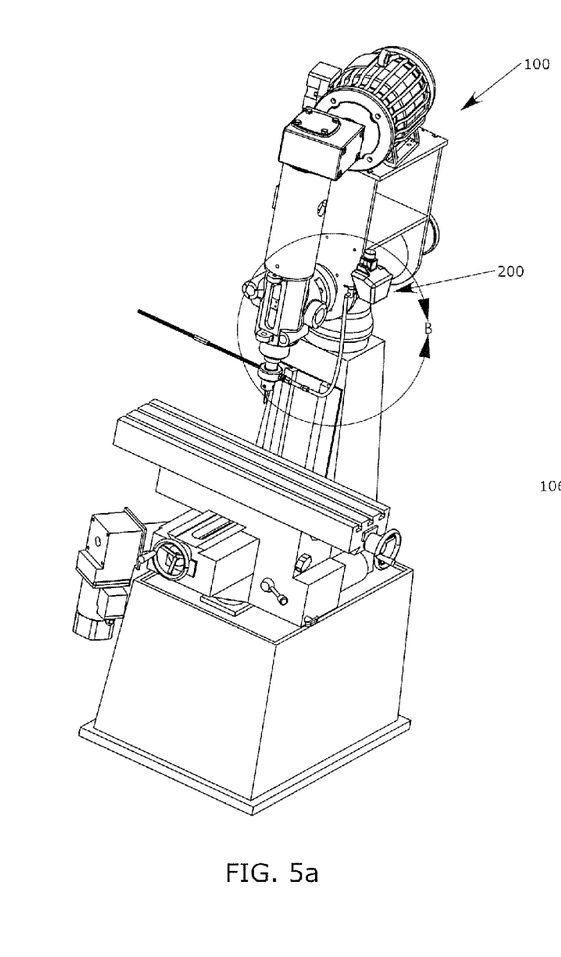
FIG. 5*a* is an alternate embodiment of the gravity-feed liquid delivery system on a knee mill.
Figure 5B:
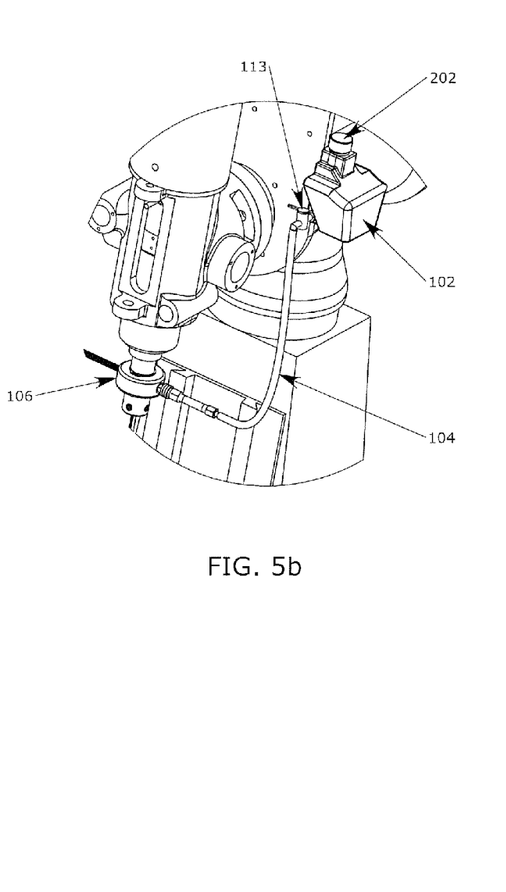
FIG. 5*b* is an enlarged detailed view of that portion of FIG. 5*a* designated in the circle B.

In an alternate embodiment illustrated in FIGS. 5a and 5b, a gravity-feed liquid delivery system 200 is provided as a separate system adaptable to any type of machine tool 100 including, but not limited to, a Knee Mill 100. In this embodiment, a ring assembly 106 is adaptable to combine with the arbor of the Mill 100. A hose 104 extends from the reservoir 102 to the ring assembly 106. The reservoir 102 is attachable at any position on or around the Mill 100.

Figure 6:
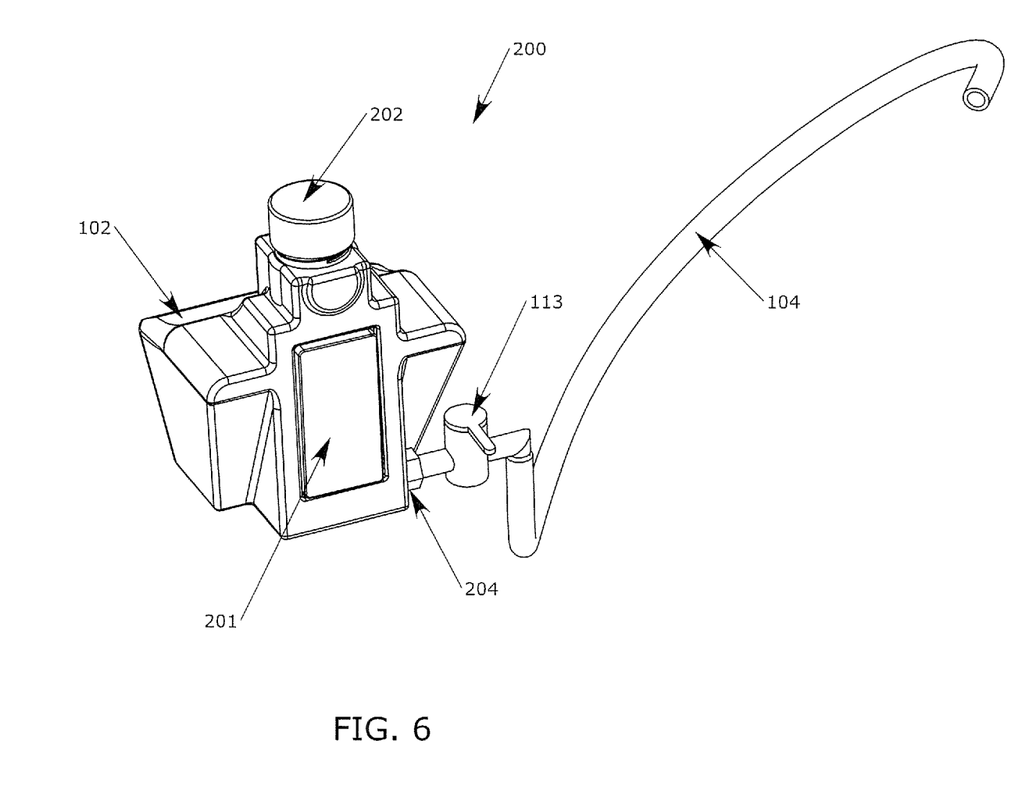
FIG. 6 is perspective view of yet another embodiment of the gravity-feed liquid delivery system as a stand alone system.

In yet another alternative embodiment and illustrated in FIG. 6, the gravity-feed liquid delivery system 200 is provided as a stand-alone system 200 having a valve 113 at the outlet 204 of the reservoir 102 and a hose 104. The hose 104 may be formed of a resilient yet flexible material that holds the hose in a temporarily fixed position. Alternatively, the hose 104 may have an attachment mechanism (not illustrated) in the form of a hook, an adhesive, or a magnet. This allows the gravity-feed liquid delivery system 200 to be adapted for use on a wide range of machine tools 100 including, but not limited to, circular saws, hand drills, and lathes.

Various aspects of any of the embodiments can be combined in different combinations than the ones shown to create new embodiments that fall within the scope of the appended claims.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents. The invention can be better understood by reference to the following claims. For purpose of claim interpretation, the transitional phrases "including" and "having" are intended to be synonymous with the transitional phrase "comprising."

What is claimed is:

1. A gravity-feed liquid delivery system for a machine tool, comprising:
   a liquid reservoir;
   the machine tool, the machine tool having an arbor assembly for mounting a bit for machining a workpiece, the arbor assembly having a hose attachment structure attached thereto;
   an attachment mechanism, in the form of a magnet, an adhesive material, or a hook, on the liquid reservoir configured for selectively attaching the liquid reservoir to a frame of the machine tool and to a structure independent and distinct from the machine tool; and
   a hose having a first end combined to the liquid reservoir and having a second end attached to the hose attachment structure to supply liquid, when the liquid reservoir is attached via the attachment mechanism to the machine tool frame and also when the liquid reservoir is attached via the attachment mechanism to the independent and distinct structure, from the liquid reservoir to an operating area of the machine tool at which the bit mounted in the arbor assembly machines the workpiece.

2. The gravity-feed liquid delivery system of claim 1, wherein the hose is translucent to allow visualization of the liquid.

3. The gravity-feed liquid delivery system of claim 2, and further comprising a valve interposed in the hose to meter the supply of liquid.

4. The gravity-feed liquid delivery system of claim 3, wherein the liquid reservoir is moveable between a first position attached to the machine tool and a second position remote from the machine tool.

5. The gravity-feed liquid delivery system of claim 4, wherein the second position is an elevated position higher than the arbor assembly of the machine tool.

6. The gravity-feed liquid delivery system of claim 5, wherein the machine tool is a portable magnetic-base drill.

7. A machine tool and liquid delivery system, comprising:
   an arbor assembly adapted to retain a drill bit;
   a removable liquid reservoir detachably attachable to the machine tool;
   a magnet attached to the liquid reservoir configured for selectively attaching the liquid reservoir temporarily to a frame of the machine tool and temporarily to a structure independent and distinct from the machine tool; and
   a hose connected between a hose attachment structure of the arbor assembly and the removable liquid reservoir so as to allow liquid to be supplied from the reservoir to the arbor assembly when the magnet attaches the liquid reservoir to the machine tool frame and also when the magnet attaches the liquid reservoir to the independent and distinct structure.

8. The machine tool of claim 7, wherein the hose is translucent.

9. The machine tool of claim 8, and further comprising a valve interposed in the hose.

10. The machine tool of claim 9, and further comprising the liquid, in fluid communication between the reservoir and the arbor assembly.

11. The machine tool of claim 10, wherein the liquid reservoir is moveable between a first position on the machine tool when the machine tool is in a vertical drilling position in which vertical drilling position the drill bit is oriented with a longitudinal axis thereof extending vertically, and a second position on a metallic work piece at an elevated position higher than the arbor assembly when the machine tool is in a horizontal drilling position in which horizontal drilling position the drill bit is oriented with a longitudinal axis thereof extending horizontally.

12. A portable gravity-feed liquid delivery system, comprising:
   a removable liquid reservoir;
   a machine tool, the machine tool having an arbor assembly for mounting a bit for machining a workpiece, the arbor assembly having a hose attachment structure attached thereto;
   an attachment mechanism in the form of a magnet, an adhesive material, or a hook, on the liquid reservoir configured for selectively attaching the liquid reservoir to a frame of a machine tool at a first position of the liquid reservoir and to a structure remote from the machine tool at a second position of the liquid reservoir; and a hose having a first end combined to the liquid reservoir and having a second end attached to the hose attachment structure to supply liquid, when the liquid reservoir is attached via the attachment mechanism to the machine tool frame and also when the liquid reservoir is attached via the attachment mechanism to the remote structure, from the liquid reservoir to an operating area of the machine tool at which the bit mounted in the arbor assembly machines the workpiece.

13. The portable gravity-feed liquid delivery system of claim 12, wherein the hose attachment structure is attached to the hose for retaining the second end of the hose in a position to supply liquid from the liquid reservoir to the operating area.

14. The portable gravity-feed liquid delivery system of claim 13, wherein the hose is translucent to allow visualization of the liquid.

15. The portable gravity-feed liquid delivery system of claim 14, and further comprising a valve combined with the hose to meter the supply of liquid.

16. The portable gravity-feed liquid delivery system of claim 12, wherein the machine tool is a Knee Mill.

17. The portable gravity-feed liquid delivery system of claim 12, wherein the second position is at an elevated position higher than a liquid delivery point at which the hose delivers liquid to the arbor assembly.

18. A gravity-feed liquid delivery system for a machine tool, comprising:
   a liquid reservoir;
   a machine tool, the machine tool having an arbor assembly for mounting a cutting tool for machining a workpiece, the arbor assembly having a hose attachment mechanism attached thereto;
   an attachment member being configured as one of a magnet, an adhesive material and a hook, the attachment member being combined with the liquid reservoir and configured for detachably and selectively attaching the liquid reservoir to a frame of the machine tool at a first position of the liquid reservoir and to a structure independent and distinct from the machine tool at a second position of the liquid reservoir, which second position of the reservoir is located away from the machine tool; and
   a hose having a first end combined to the liquid reservoir and having a second end attached to the hose attachment mechanism, in order to supply liquid, when the liquid reservoir is attached via the attachment member to the machine tool frame and also when the liquid reservoir is attached via the attachment member to the structure, from the liquid reservoir to an operating area of the machine tool at which the cutting tool mounted to the arbor assembly machines the workpiece.

19. The gravity-feed liquid delivery system of claim 18, wherein the hose is translucent to allow visualization of the liquid.

20. The gravity-feed liquid delivery system of claim 19, and further comprising a valve interposed in the hose to meter the liquid.

21. The gravity-feed liquid delivery system of claim 18, wherein the cutting tool is a drill bit, and wherein the machine tool is positionable in a horizontal drilling position in which horizontal drilling position a longitudinal axis of the drill bit extends horizontally, and when the machine tool is in the horizontal drilling position, the liquid reservoir is located at the second position, and wherein the second position is a position that is elevated above the machine tool.

22. The gravity-feed liquid delivery system of claim 21, wherein the second position is at an elevated position higher than the arbor assembly of the machine tool.

23. The gravity-feed liquid delivery system of claim 22, wherein the machine tool is a portable magnetic-base drill.

24. A gravity-feed liquid delivery system for a machine tool, comprising:
   a liquid reservoir;
   a machine tool, the machine tool having an arbor assembly for mounting a cutting tool for machining a workpiece, the arbor assembly having a hose attachment structure attached thereto;
   an attachment mechanism comprising a magnet attached to a side of the liquid reservoir for selectively attaching the liquid reservoir temporarily to a frame of the machine tool and to a structure independent and distinct from the machine tool; and
   a hose having a first end combined to the liquid reservoir and having a second end attached to the hose attachment structure to supply liquid, when the liquid reservoir is attached via the attachment mechanism to the machine tool frame and also when the liquid reservoir is attached via the attachment mechanism to the independent and distinct structure, from the liquid reservoir to an operating area of the machine tool at which the cutting tool mounted to the arbor assembly machines the workpiece.

\* \* \* \* \*